United States Patent Office 3,851,017
Patented Nov. 26, 1974

3,851,017
THIXOTROPIC ANAEROBIC COMPOSITION
Gerhardt P. Werber, Guilford, Conn., assignor to Loctite Corporation, Newington, Conn.
No Drawing. Continuation-in-part of abandoned application Ser. No. 89,025, Nov. 12, 1970. This application June 14, 1972, Ser. No. 262,891
Int. Cl. C08f 29/12, 37/18
U.S. Cl. 260—897 B                   6 Claims

ABSTRACT OF THE DISCLOSURE

Thixotropic anaerobic compositions containing a polymerizable acrylate ester monomer, a peroxy polymerization initiator and an insoluble organic thixotropic agent have a Brookfield viscosity at 2½ r.p.m. of at least 5000 cp., which is at least 50% greater than the Brookfield viscosity at 20 r.p.m.

In preferred compositions, the specific gravity of the organic thixotropic agent approximates that of the thixotropic anaerobic composition.

CROSS REFERENCE TO RELATED APPLICATION

This is a continuation-in-part of copending application Ser. No. 89,025, filed Nov. 12, 1970, now abandoned.

BACKGROUND OF THE INVENTION

Anaerobic compositions are precatalyzed, curable compositions, composed of polymerizable acrylate esters and peroxy polymerization initiators. As oxygen serves chemically as a polymerization inhibitor for these systems, the balance between initiation and inhibition of polymerization is tipped in favor of inhibiton by the presence of atmospherc oxygen. For this reason, the products are sold in partially empty containers, generally made of air permeable plastic such as low density polyethylene. However, when placed between metal or other air impermeable surfaces (for example, between the threads of a nut and a bolt), the inhibiting influence of atmospheric oxygen is removed, and hence the catalyzed composition begins to cure.

Anaerobic compositions, because of their unique curing characteristics, have found utility as polymerizable adhesives and sealants. The fact that these compositions generally are readily flowable liquids, however, has placed limitations on their areas of use.

For example, in production line applications, it generally has been necessary to apply the liquid immediately before assembly because of the tendency of the liquid anaerobic composition of flow or "migrate" from the part. Migration can produce several problems. If all or a large portion of the anaerobic composition migrates from the area of application, unsatisfactory sealing or bonding frequently can result. Additionally, and particularly when used in large volume applications where automatic parts handling and application equipment are used, the anaerobic composition could migrate to and penetrate various moving parts of the handling and application equipment. Upon cure, the composition could adversely affect the operation of the parts.

Various attempts have been made to improve anaerobic compositions and alleviate these problems. For example, more viscous anaerobic compositions have been prepared by the use of soluble thickeners, for example up to approximately 6000 centipoise at room temperature. In this way the tendency of the anaerobic composition to migrate is reduced, and its capability for retention on the part is increased. However, the increase in viscosity reduced the ability of the anaerobic composition to penetrate into the interstices between closely fitting parts, and also increased the tendency of the anaerobic composition to be wiped from the application surface by the surface which was to be mated therewith. For example, anaerobic compositions frequently are used to bond closely fitting shafts and hubs. Once again this produced a lack of sufficient anaerobic composition between the surfaces to be sealed or bonded, and left substantial anaerobic composition outside the application joint, thereby increasing the opportunity for the anaerobic composition to be inintentionally removed to an area where it can produce unwanted results.

Additionally, it was found that the presence of substantial amounts of thickeners adversely affected the rate of cure of the anaerobic composition. As the viscosity increased (i.e., as higher levels of thickener were used), this tendency to decrease cure speed became more pronounced. This was particularly undesirable since the cure of anaerobic compositions tends to be slower as the clearances between parts to be sealed or bonded increases, the very applications where the more viscous anaerobic compositions were used.

Another of the earlier attempts was the thickening of anaerobic compositions by the use of insoluble fumed silica. (While silica also imparted a thixotropic character to the composition, it has been considered a thickener because of the highly structured character of systems containing silica, even at relatively low levels; the high viscosity level is not easily broken.) In addition, major problems were encountered with systems containing silica because of the fact that substantial adverse effect upon rate of cure was noted, and because they became progressively more highly structured and more viscous with passing time. When used at very low levels, in an attempt to solve the extreme viscosity problem, the silica tended to settle and was extremely difficult to redisperse.

In another attempt to solve the above-defined problems, non-flowable anaerobic compositions were prepared, for example by dispersing throughout the anaerobic composition a network of insoluble organic particles. The use of products of this type did solve one aspect of the migration problem. In its non-flowable state, the composition would not migrate from the part to which it had been applied. However, because of its relatively firm structure, the wipe off problem described above generally was accentuated. It also was found that the problems with decreased rate of cure persisted, and because of the extremely high levels of material required to produce a non-flowable composition, substantial reduction of ultimate properties (e.g., tensile strength, heat resistance, etc.) also was noticed.

Anaerobic compositions which substantially reduced or eliminated the above-described problems inherent in prior art anaerobic compositions would be a material advance in the art, and of great utility in today's industry.

It has been found that novel and highly useful thixotropic anaerobic compositions can be prepared by incorporating therein insoluble organic compounds which serve as thixotropic agents.

The anaerobic compositions of this invention are liquid compositions which comprise a polymerizable mixture of an acrylate ester monomer and a peroxy polymerization initiator therefor, in combination with an insoluble organic thixotropic agent in an amount suitable to produce a Brookfield viscosity at 2½ revolutions per minute of at least about 5000 centipoise, said Brookfield viscosity at 2½ revolutions per minute being at least 50% greater than the Brookfield viscosity at 20 revolutions per minute.

In another aspect of this invention, in addition to the above viscosity requirements, the organic thixotropic agent has a specific gravity which does not deviate substantially from the specific gravity of the thixotropic anaerobic composition as a whole. Specifically, the specific gravity of the organic thixotropic agent is less than about 2.0 and does not deviate by more than 50% from the specific gravity of the thixotropic anaerobic composition.

While all organic compounds which produce the physical properties defined above are deemed within the broad scope of this invention, it has been found that the organic thixotropic agents most useful in this invention are organic compounds selected from the class consisting of saturated and unsaturated hydrocarbons; fatty acids; ammonium, alkali and alkaline earth metal salts of fatty acids; esters; and amides of fatty acids.

Quite surprisingly, it has been found that the thixotropic anaerobic compositions prepared according to this invention retain the preponderance of their cure characteristics. For example, substantially greater cure speed retention is noted in the compositions of this invention, as compared to the high viscosity, thickened prior art compositions containing soluble or insoluble thickeners.

DESCRIPTION OF THE INVENTION AND ITS PREFERRED EMBODIMENTS

A. The Thixotropic Agents

There are several standard and well known means of viscosity measurement. See, for example, Perry, "Chemical Engineers' Handbook" 3rd. ed., 1950, page 1201. One of the most common and widely used is the "Brookfield viscosity," which is obtained by measuring the force required to turn a spindle in a fluid in question. Brookfield viscometers and information covering this type of measurement are readily available from Brookfield Engineering Laboratories, Inc., Stoughton, Mass.

A convenient and accurate method for defining "thixotropy" is by reference to the Brookfield viscosity of the liquid at two significantly different spindle speeds, such as two and one-half and twenty revolutions per minute. This method has been adopted herein. Unless specifically stated to the contrary herein, all viscosities and viscosity measurements refer to viscosities and viscosity measurements at 25° C. (77° F.).

As indicated above, the thixotropic compositions of this invention have a Brookfield viscosity at two and one-half revolutions per minute of at least about 5000 centipoise, and this viscosity is at least about 50% greater than the Brookfield viscosity at twenty revolutions per minute. Preferably, the Brookfield viscosity at two and one-half revolutions per minute is at least about 8000 centipoise or more, and most preferably at least about 10,000 centipoise. At the lower end, the Brookfield viscosity at twenty revolutions per minute must at least meet the relationship to the Brookfield viscosity at two and one-half revolutions per minute, defined above. Preferably the viscosity at twenty revolutions per minute is no more than about 3000 centipoise, and most preferably is no more than about 2000 centipoise.

In the most highly useful and desirable compositions of this invention, the difference between the Brookfield viscosities at two and one-half revolutions per minute and twenty revolutions per minute is as great as possible. Preferably the former is at least about 100% greater than the latter, and most preferably is at least about 300% greater than the latter.

With regard to the organic compounds which may serve as organic thixotropic agents, there are several important characteristics which define the suitable compounds, the key being the ability to produce the thixotropic characteristics defined above. Additionally, the thixotropic agent must be substantially insoluble in the anaerobic composition. While many usable compounds have minor solubility in the anaerobic composition (e.g., 5% by weight or less at 75° F.), it is preferred that the thixotropic agent has a solubility in the anaerobic composition which does not exceed about 1% by weight at 25° C. The scope of this invention is intended to encompass only those organic thixotropic agents which meet the above thixotropic and solubility criteria.

When dealing with preferred embodiments of this invention, the thixotropic agents will be solid materials having a melting point of at least 85° F., preferably at least about 100° F., and most preferably at least about 120° F. While it is possible to form thixotropic systems from a mixture of two liquids, solid thixotropic agents produce more desirable properties, particularly as applied to the variations in viscosity which must be achieved to form the compositions of this invention.

In another aspect of this invention, extremely novel and useful thixotropic anaerobic compositions are produced by the use of an organic thixotropic agent having a specific gravity which is not substantially different from the specific gravity of the thixotropic anaerobic composition. Specifically, the specific gravity of the thixotropic agent should not deviate by more than about 50% from the specific gravity of the thixotropic anaerobic composition. Based upon the specific gravities of anaerobic compositions (traceable essentially to the specific gravities of the acrylate monomers used), this means the organic thixotropic agent will have a specific gravity of less than 2.0, and nearly all cases, less than about 1.8. Preferably, the specific gravity of the thixotropic agent is less than or only slightly greater than the specific gravity of the anaerobic composition, and most preferably has a specific gravity which is between about 0.6 and about 1.1 times the specific gravity of the thixotropic anaerobic composition.

When the specific gravity of the thixotropic agent is as defined herein, the solid materials upon separation, as a portion of the solid material commonly does in these systems, will not compact and hence will be readily redispersed. When its specific gravity is equal to or less than that of the anaerobic composition as a whole, it will tend to rise and compact slightly near the upper surface of the composition. In addition to being easily detectable, it has been found that redistribution of the thixotropic agent is substantially easier and more effective under these conditions than when the thixotropic agent settles to the bottom. Also, it has been found that when such a composition is dispensed, portions of the thixotropic agent and anaerobic composition will be dispensed together, thus leaving the balance of the composition in the container with reasonably balanced portions of both ingredients for future use.

The broad scope of this invention is determined by reference to the specific physical characteristics defined above. While the reasonably skilled chemist, with the above definitions and guidelines easily will be able to determine the compositions which fall within the scope of this invention, the following organic thixotropic agents are given as typical examples to illustrate the materials involved, and to give preferred compounds for use within the scope of this invention. The most preferred compounds are hydrocarbons meeting the melting point limitations defined above. Typical examples are petrolatum (average melting point approx. 95° F.) and paraffin (average melting point approx. 130° F.). The most highly preferred are hydrocarbon polymers, particularly polyethylene, used in powdered form, such as the polyethylene powder sold under the trade name "Microthene FN-510" by USI Chemical Co. Other comparable insoluble polymers may be used, e.g., modified hydrocarbon polymers such as polyvinyl chloride.

Other compounds which may be used are organic esters such as cellulose triacetate, and particularly waxy esters (e.g., containing a minimum of about 30 carbon atoms, preferably between about 40 and about 75 carbon atoms) such as glyceryl tristearate, myricyl cerotate (i.e., Carnauba Wax) and glyceryl tris-12-hydroxystearate (i.e., Castor Wax). Similarly, fatty acids (generally ten carbon atoms or more) may be used, examples of which are stearic acid and hydroxy stearic acid. Another useful class of thixotropic agents are the ammonium, alkali and alkaline earth metal salts of the above fatty acids, and amides of such fatty acids. Typical examples within this grouping are calcium, lithium or aluminum stearate, calcium lithium or aluminum octoate, ammonium stearate and stearamide.

Of all of the above described compounds, the polyethylene and the waxy esters are considered superior.

A minimum of routine testing and viscosity measurement will easily determine the optimum amount of organic thixotropic agent for use in the compositions of this invention. In discussing use levels, as well as specific thixotropic agents, it is important to keep in mind the inherent physical-chemical aspects of thixotropy. The particular size of a given thixotropic agent is important, and lower use levels will suffice if a small particle size is used. Similarly, particle geometry is a factor, "needle" and "thread" like structures (and others with a high surface to volume ratio) generally being usable at lower levels. Hence, the thixotropic agent chosen must be used at a sufficient level to produce a metastable solid structure within the liquid composition, producing a liquid anaerobic system having the thixotropic characteristics defined above.

Based upon the above considerations, the workable and optimum levels of use will vary from one compound to the next. However, as broad guide lines, it has been found that a general use range for the organic thixotropic agent is from about 5% to about 60% by weight of the thixotropic anaerobic composition, and most preferably from about 10% by weight to about 50% by weight. Specifically with the fatty acids, low melting esters and hydrocarbons, and other materials which can be dissolved in the anaerobic composition at elevated temperatures, followed by cooling to precipitate many small solid particles, optimum level of usage generally will vary between about 5 to 10% and about 30% by weight of the composition. With extremely insoluble solids, generally having high melting points, such as polyethylene and other such polymers, fatty acids salts and amides, and esters such as cellulose esters, distribution must be by vigorous agitation, such as high shear mixing. In this case, small uniform particles are not easily formed, and the optimum level of use generally is between about 10 to 15% and about 40% by weight or slightly higher. Within these broad and preferred ranges, the exact optimum will be determined by the specific compound used, and the exact method of preparation.

In view of the fact that thixotropy is obtained by the use of comparatively high levels of the insoluble organic compounds (as compared to the silica, for example), the systems of this invention are easily prepared, in the sense that extreme control over the amount of material added is not required. Since these thixotropic agents do not form highly structured systems, even with the passage of substantial periods of time, an ideal thixotropic condition is produced.

Readily flowably compositions are generated with, e.g., a minimum of shaking, and yet the system will readily revert to its higher viscosity state shortly after application to a part destined to be sealed or bonded. Movement during application and assembly reduces the composition to its lower viscosity form, and assures coverage or penetration of the interstices of the various parts, and reduces the tendency to "wipe off." After application or assembly, the composition assumes its high viscosity form and the tendency to migrate is eliminated.

B. The Monomers

The most desirable monomers for use in the thixotropic anaerobic compositions of this invention are polymerizable acrylate esters. Preferably at least a portion, and most preferably at least 50% by weight, of the acrylate monomer is a di- or other polyacrylate ester. These polyfunctional monomers produce cross-linked polymers, which serve as more effective and more durable sealants and adhesives.

The polyacrylate esters may be represented by the formula (1) 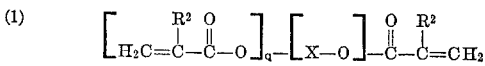

wherein $R^2$ is a radical selected from the group consisting of hydrogen, halogen and alkyl of from 1 to about 4 carbon atoms; $q$ is an integer equal to at least 1, and preferably equal to from 1 to about 4; and X is an organic radical, preferably a hydrocarbon radical, containing at least two carbon atoms and having a total bonding capacity of $q$ plus 1. Preferably X contains a maximum of about 40 carbon atoms, and most preferably a maximum of about 25 carbon atoms. For example, X can be an organic radical of the formula

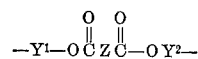

wherein each of $Y^1$ and $Y^2$ is a hydrocarbon group containing at least 2 carbon atoms, and preferably from 2 to about 10 carbon atoms, and Z is a hydrocarbon group containing at least 1 carbon atom, and preferably from 2 to about 10 carbon atoms. Another class of useful polyacrylate ester monomers are the isocyanatemonoacrylate reaction products described in United States Patent 3,425,988 to Toback and Gorman, issued Feb. 4, 1969.

The most highly preferred acrylate esters which can be used in the compositions disclosed herein are polyacrylate esters which have the following general formula:

(2) 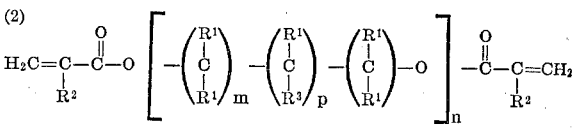

wherein $R^1$ represents a radical selected from the group consisting of hydrogen, lower alkyl of from 1 to about 4 carbon atoms, hydroxy alkyl of from 1 to about 4 carbon atoms, and

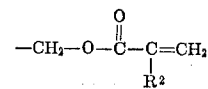

$R^2$ is a radical selected from the group consisting of hydrogen, halogen, and lower alkyl of from 1 to about 4 carbon atoms; $R^3$ is a radical selected from the group consisting of hydrogen, hydroxyl, and

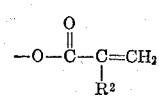

$m$ is an integer equal to at least 1, e.g., from 1 to about 15 or higher, and preferably from 1 to about 8 inclusive; $n$ is an integer equal to at least 1, e.g., 1 to about 40 or more, and preferably between about 2 and about 10; and $p$ is one of the following: 0, 1.

The polymerizable polyacrylate esters utilized in accordance with the invention and corresponding to the above general formula are exemplified by, but not restricted to, the following materials:

di-, tri- and tetraethyleneglycol dimethacrylate;
dipropyleneglycol dimethacrylate;
polyethyleneglycol dimethacrylate;
polypropyleneglycol dimethacrylate;
di(penamethyleneglycol) dimethacrylate;
tetraethyleneglycol diacrylate;

tetraethyleneglycol di(chloroacrylate);
diglycerol diacrylate;
diglycerol tetramethacrylate;
tetramethylene dimethacrylate;
ethylene dimethacrylate;
butyleneglycol dimethacrylate;
neopentylglycol diacrylate; and
trimethylolpropane triacrylate.

While di- and other polyacrylate esters—and particularly the polyacrylate esters described in the preceding paragraphs—have been found particularly desirable, monofunctional acrylate esters (esters containing one acrylate group) also may be used. When dealing with monofunctional acrylate esters, it is preferable to use an ester which has a relatively polar group in the alcoholic moiety. Such materials are less volatile than low molecular weight alkyl esters and, more important, the polar group tends to provide intermolecular attraction in the cured polymer, thus producing a more durable sealant or adhesive. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Other acrylates can be used in the anaerobic compositions. However, when other acrylates are used, they preferably are used in combination with one or more of the polyacrylate and monoacrylate ester monomers described above. Most preferably, polyacrylates having the chemical formula (2), given above, comprise at least about fifty percent by weight of the acrylates used since these monomers have been found clearly superior in anaerobic compositions.

C. The Initiators

As indicated above, the liquid thixotropic anaerobic compositions discussed herein contain a peroxy polymerization initiator capable of polymerizing the acrylate ester monomer in the substantial absence of oxygen. While certain organic peroxides (such as dialkyl peroxides) have been disclosed as useful initiators in, e.g. U.S. Pats. 3,419,512 to Lees, issued Dec. 31, 1968, the hydroperoxides are highly superior and compositions containing them constitute highly preferred embodiments of this invention. In fact, the hydroperoxide systems are the only ones which have achieved commercial acceptance. The real benefit of the dialkyl peroxide initiators is as a co-initiator with the hydroperoxides to make the cure properties of the anaerobic composition more universal.

Hydrogen peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl hydroxycyclohexyl peroxide and t-butyl perbenzoate, respectively.

While the nature of the organic hydroperoxides is not critical to the broad concept of this invention, the general class of hydroperoxides can be represented by the formula $R^4OOH$, wherein $R^4$ generally is a hydrocarbon group containing up to about 18 carbon atoms, and preferably is an alkyl, aryl or aralkyl hydrocarbon group containing from about 3 to 12 carbon atoms. Naturally $R^4$ can contain any substitutent or linkage, hydrocarbon or otherwise, which does not affect the hydroperoxide adversely for the purpose disclosed herein. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexane, and various ketones and ethers, including certain compounds represented by the general formula (2) above. The organic hydroperoxide initiators which are used commonly comprise less than about 10 percent by weight of the combination of polymerizable monomer and initiator, since above that level adverse effects on the strength and durability of the cured composition may be experienced. Preferably the hydroperoxide initiator comprises from about 0.1 percent to about 5 percent by weight of the combination.

D. Accelerators

While the benefits of this invention are achievable in all anaerobic compositions, they are seen most clearly in anaerobic compositions which contain latent polymerization accelerators. Latent polymerization accelerators do not of themselves initiate cure; however, they do accelerate the cure reaction once it has been otherwise initiated at the time of use. Incorporation of latent polymerization accelerators in the anaerobic composition avoids the need to add accelerators either to the anaerobic composition or the surfaces to be bonded, sealed, etc., at the time of use.

The most common of these accelerators suitable for incorporation in the thixotropic anaerobic compositions are discussed below and the benefits of the invention are achievable with any of such accelerators. It should be noted, however, that large numbers of latent polymerization accelerators are known in the art, and the broad concept of this invention is intended to encompass any such accelerator which can be incorporated in the composition without destroying its essential characteristics.

Among the earliest, and still the most common, of the latent polymerization accelerators used in anaerobic composition were amines. The most commonly used are tertiary amines such as tributylamine and triethylamine.

Essentially the entire class of tertiary amines can be used in such compositions, and the class may be broadly represented by the formula

wherein each of $R^5$, $R^6$ and $R^7$ is an organic radical, preferably a hydrocarbon group containing up to about ten carbon atoms. Naturally the hydrocarbon groups can contain any substituent or linkage which does not adversely affect the ability of the amine to perform its intended function. Preferably, each of $R^5$, $R^6$ and $R^7$ is an alkyl, aryl or aralkyl group containing up to about 8 carbon atoms.

The N,N-dialkyl aryl amines are particularly effective tertiary amines. Typical amines within this class may be represented by the following general formula:

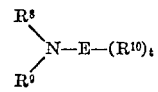

wherein E represents a carbocyclic aromatic nucleus selected from the group consisting of phenyl and naphthyl radicals; $R^8$ and $R^9$ are hydrocarbon groups containing up to about 10 carbon atoms, and preferably are lower alkyl radicals of 1 to 4 carbon atoms; $t$ is one of the following: 0, integer equal to from 1 to 5 inclusive; $R^{10}$ is a hydrocarbon group containing up to about 5 carbon atoms, and preferably is a member selected from the group consisting of lower alkyl and lower alkoxy radicals of 1 to 4 carbon atoms inclusive, provided that when an $R^{10}$ radical is in the ortho position, $t$ is greater than 1. Naturally, $R^8$, $R^9$ and $R^{10}$ can contain any substituent or linkage which does not adversely affect the ability of the amine to perform its intended function.

Certain primary amines ($R^5$ and $R^6$ in the above formula are hydrogen) and secondary amines ($R^5$ is hydrogen) also can be used as accelerators, but care must be exercised since they are potent accelerators. They frequently can cause stability problems if used in too large an amount. The most desirable class of secondary amines, particularly heterocyclic secondary amines containing up to about 20 carbon atoms. It also is preferred to use those amines wherein the heterocyclic ring is hydrogenated. Typical of such compounds are pyrrolidine, piperazine and 1,2,3,4-tetrahydroquinoline.

Another highly successful class of accelerators is the organic sulfimides, i.e., organic compounds which contain the group

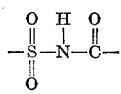

Because of the extreme effectiveness of the sulfimides as accelerators for anaerobic compositions, their use in the anaerobic compositions of this invention constitutes a highly preferred practice thereof. While the broad class of organic sulfimides can be used successfully, the sulfimides most commonly used can be represented by the formula

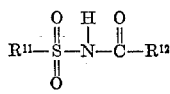

wherein each of $R^{11}$ and $R^{12}$ is a hydrocarbon group containing up to about ten carbon atoms, and preferably up to about six carbon atoms. Naturally, $R^{11}$ and $R^{12}$ can contain any linkage or substituent which does not adversely affect the sulfimide for its intended use in the anaerobic composition. Further, $R^{11}$ and $R^{12}$ can be united to bond the sulfimide group in a heterocyclic ring, or a polynuclear heterocyclic ring system. Of the organic sulfimides benzoic sulfimide has been found to be the most preferable.

An even more highly preferred composition is that which contains a sulfimide, particularly benzoic sulfimide, in combination with either a heterocyclic secondary amine or a tertiary N,N-dialkyl aryl amine, both of which are described above. For an expanded discussion of this type of system, reference is made, to United States Patent 3,218,305 to Krieble, issued Nov. 16, 1965.

Other less active accelerators can be used in the compositions of this invention. Typical examples of such accelerators are succinimide, phthalimide and formamide.

Routine testing easily will determine the optimum amount of accelerator which can be incorporated in a given anaerobic composition. However the following general guide lines may be used. With regard to tertiary amines, large amounts may be used if desired, up to about 10 percent by weight of the composition, or higher. However, little if any additional benefit is obtained above about 5 percent. Most preferably these tertiary amine accelerators are used at from about 1 percent to about 4 percent by weight of the anaerobic composition. The succinimide, phthalimide and formamide accelerators also can be used in significant amounts, up to about 10 percent by weight of the composition, or higher, and preferably from about 1 percent to about 5 percent by weight. The sulfimide and heterocyclic secondary amine accelerators generally are used at less than about 6 percent by weight of the anaerobic composition, although in some cases it is possible to use higher levels. In the special case where a sulfimide is used in combination with a heterocyclic secondary amine or an N,N-dialkyl arylamine, the total of the two accelerators preferably does not exceed about 6 percent by weight of the anaerobic composition, and either component does not exceed about 4 percent by weight.

E. Other Ingredients

Other ingredients can be used in the anaerobic compositions of this invention, and in its preferred aspects polymerization inhibitors and latent accelerators of free radical polymerization are included. The quinones have been found to be a particularly effective class of polymerization inhibitors, and can be used herein. Typical examples of other useful ingredients are thickeners, plasticizers, dyes and adhesive agents. Such ingredients can be used in such combinations and proportions as is desired, provided they do not affect adversely the anaerobic nature of the composition. While exceptions may exist in some cases, these materials generally do not comprise more than about 50 percent by weight of the total composition, and preferably not more than about 20 percent by weight of the composition.

The following Examples are given to demonstrate the preparation and use of compositions within the scope of the invention disclosed herein. The Examples are not intended to be limitations upon the scope of the invention. Unless specifically stated to the contrary therein, all weights and ratios in the Examples are on a weight basis.

EXAMPLES

Example I

A polymerizable composition was prepared which had the following approximate composition:

| Ingredient: | Approx. wt. percent |
|---|---|
| Polyethyleneglycol dimethacrylate | 93 |
| (Approx. avg. molecular weight=330) | |
| Cumene hydroperoxide | 2 |
| Benzoic sulfimide | 4 |
| Diethyl-p-toluidine | 1 |

Minor amounts (less than 0.1% by weight) of free radical stabilizers were added, and the polymerizable mixture was divided into three portions, the first portion of which was allowed to remain unchanged in composition, and was identified as Anaerobic Composition I. Ninety parts by weight of the second portion were mixed with 10 parts by weight of finely powdered polyethylene, sold under the name "Microthene FN–510" by USI Chemical Company, and was identified as Anaerobic Composition II. Sixty parts by weight of the third portion were mixed with 40 parts by weight of the powdered polyethylene of the preceding sentence, and was identified as Anaerobic Composition III. Each of Anaerobic Compositions II and III were prepared by mixing the polyethylene and the polymerizable composition vigorously until the polyethylene was uniformly dispersed, forming a liquid thixotropic composition.

Anaerobic Compositions I through III were tested on various metallic nuts and bolts to determine their cure characteristics. In the test, several drops of the anaerobic composition in question were placed on the threaded area of a standard ⅜ inch bolt, and a mating nut was assembled over the anaerobic composition. After a predetermined period, either 4 hours or 72 hours from assembly, the force required to produce the first relative movement between the nut and bolt was determined. The 4 hour cure period was designed to give an indication of the speed at which the anaerobic composition cured, and the 72 hour cure period designed to determine the "full cure" properties of the anaerobic composition. The results are presented below in Table I, tabulated by reference to the surface metal of the nuts and bolts tested. In these tests, each anaerobic composition was not tested on each surface at each cure period.

TABLE I

| Anaerobic composition | Torque (in. lb.) | | | | | |
|---|---|---|---|---|---|---|
| | 4 hour cure | | | 72 hour cure | | |
| | Iron | Cadmium | Zinc | Iron | Cadmium | Zinc |
| I | 67 | 17 | 23 | 63 | 22 | |
| II | 100 | 17 | 30 | 65 | 26 | |
| III | | | | 77 | 32 | 43 | the viscosity of Anaerobic Composition III was determined at 25° C. with a Brookfield Viscometer, No. 3 spindle. The viscosity was measured at 2.5 revolutions per minute and at 20 revolutions per minute. At 2.5 revolutions per minute, the viscosity was found to be 12,160 centipoise, whereas at 20 revolutions per minute it was found to be 2,295 centipoise, to give a viscosity ratio under these conditions of approximately 5.5:1.

Example II

Anaerobic Composition IV was prepared by mixing the following ingredients with less than 0.1% by weight of free radical stabilizers:

| Ingredient: | Approx. wt. percent |
| --- | --- |
| 1,3-butyleneglycol dimethacrylate | 67.5 |
| Chlorinated paraffin wax [1] | 17 |
| Paraffin wax | 8.5 |
| Cumene hydroperoxide | 1 |
| 2,5-dimethyl-2,5-di-t-butyl peroxyhexane | 4 |
| Dimethyl-p-toluidine | 1 |
| Benzoic sulfimide | 1 |

[1] Sold under the name "Chlorowax 500C" by Diamond Shamrock Co

The composition was prepared by mixing all ingredients at a temperature wherein the paraffin wax and chlorowax dissolved in the anaerobic composition (approx. 60° C.), and thereafter the composition was allowed to cool under constant mixing to precipitate the solid waxy particles and form a liquid, thixotropic anaerobic composition.

Anaerobic Composition IV was used to bond iron nuts and bolts, as described above in Example I. The nuts and bolts were inspected three hours after assembly, and it was found that the nut could not be moved relative to the bolt. The anaerobic curing characteristics also were tested by placing a drop of Anaerobic Composition IV between two overlapping glass slides. It was found that the composition hardened between the glass slides in less than an hour.

Anaerobic Composition V was prepared, having the same composition and method of preparation as described above for Anaerobic Composition IV, except that Carnauba Wax (which is primarily myricyl cerotate) was substituted for the paraffin wax. This liquid, thixotropic composition produced substantially the same results as indicated above for Anaerobic Composition IV.

Example III

A polymerizable composition was prepared by mixing 0.3% by weight cumene hydroperoxide, 4% by weight benzoic sulfimide, 5% by weight 2,5-dimethyl-2,5-di-t-butyl peroxyhexane, 1% dimethyl-p-toluidine, and less than 0.1% by weight free radical stabilizers with the polyethyleneglycol dimethacrylate of Example I. This polymerizable mixture then was used to prepare Anaerobic Compositions VI and VII. Anaerobic Composition VI was composed of 90% by weight of the polymerizable mixture of this paragraph and 10% by weight of stearic acid; Anaerobic Composition VII was prepared by mixing 70% by weight of the polymerizable mixture with 30% by weight of glycerol trilaurate. In each case, the anaerobic composition was prepared by mixing all of the ingredients at a temperature at which the thixotropic agent dissolved in the polymerizable mixture (approx. 70° C.), followed by cooling with constant stirring to form the liquid, thixotropic anaerobic composition.

Anaerobic Composition VI was tested as described in Example I on clean cadmium plated nuts and bolts, and on cadmium plated nuts and bolts to which had been applied a thin film of 20 weight oil. Anaerobic Composition VII was tested on clean cadmium plated nuts and bolts only. After approximately 20 hours, 20 inch-pounds of force were required to move the nut relative to the bolt on the oil coated cadmium nuts and bolts for both Anaerobic Composition VI and Anaerobic Composition VII, and a force of 75 inch-pounds was required to move the nut relative to the bolt on the non-oiled cadmium surface which had been treated with Anaerobic Composition IV.

Example IV

A polymerizable mixture was prepared which had the following approximate composition:

| Ingredient: | Approx. wt. percent |
| --- | --- |
| 1,3-Butyleneglycol dimethacrylate | 94.5 |
| Diethyl-p-toluidine | 0.8 |
| Cumene hydroperoxide | 3.0 |
| Benzoic sulfimide | 1.5 |
| Ammonia | 0.2 |

After adding a minor amount of free radical stabilizers (less than 0.1% by weight), the polymerizable mixture was used to prepare Anaerobic Compositions VIII, IX and X. Anaerobic Compositions VIII–X contained the following thixotropic agents in the approximate amounts listed, based upon the weight of the final Anaerobic Composition:

| Anaerobic Composition: | Thixotropic agent (wt. percent) |
| --- | --- |
| VIII | Aluminum stearate (38) |
| IX | Aluminum octoate (29) |
| X | Aluminum octoate (17) |

Each Anaerobic Composition was prepared by incorporating all ingredients under high shear until the thixotropic agent was uniformly dispersed and the liquid, thixotropic anaerobic composition produced.

Each Anaerobic Composition was tested on clean cadmium nuts and bolts and on oil coated cadmium nuts and bolts, as described above in Example III. The assemblies were tested after approximately 24 hours, and in each case it was found that the nut could not be turned by hand relative to the bolt.

What is claimed is:

1. A thixotropic liquid anaerobic composition which comprises a polymerizable acrylate ester monomer, a peroxy polymerization initiator capable of polymerizing said monomer in the substantial absence of oxygen, and from about 5% to about 60% by weight of an organic thixotropic agent comprising finely powered polyethylene substantially insoluble in the balance of the anaerobic composition, said thixotropic agent being used in an amount sufficient to produce a Brookfield viscosity at 2½ revolutions per minute of at least about 5000 centipoise, said Brookfield viscosity at 2½ revolutions per minute being at least about 50% greater than the Brookfield viscosity at 20 revolutions per minute.

2. The composition of Claim 1 wherein the Brookfield viscosity at 2½ revolutions per minute is at least about 100% greater than the Brookfield viscosity at 20 revolutions per minute, and the organic thixotropic agent has a specific gravity less than about 2.0.

3. The composition of Claim 2 which additionally contains an accelerator of free radical polymerization.

4. The method of improving an anaerobic composition comprising a polymerizable acrylate ester monomer and a peroxy polymerization initiator for said monomer, which comprises dispersing uniformly throughout the anaerobic composition from about 5% to about 60% by weight of an organic thixotropic agent comprising finely powered polythylene in an amount sufficient to produce a Brookfield viscosity at 2½ revolutions per minute of at least 5000 centipoise, said Brookfield viscosity at 2½ revolutions per minute being at least about 50% greater than the Brookfield viscosity at 20 revolutions per minute.

5. The method of Claim 4 wherein the Brookfield viscosity at 2½ revolutions per minute is at least about 5000 centipoise and the Brookfield viscosity at 20 revolutions per minute is less than about 3000 centipoise.

6. The method of Claim 4 wherein the Brookfield viscosity at 2½ revolutions per minute is at least about 8000 centipoise and the Brookfield viscosity at 20 revolutions per minute is less than about 2000 centipoise.

References Cited

UNITED STATES PATENTS 3,300,547   1/1967   Gorman et al. _____ 260—885
3,547,851   12/1970  Frauenglass _____ 260—30.8

DONALD E. CZAJA, Primary Examiner

W. E. PARKER, Assistant Examiner

U.S. Cl. X.R.

260—23 R, 28.5 A, 28.5 AV, 30.8 R, 31.2 VA, 52.4 R, 32.6 R, 33.6 R.

UNITED STATES PATENT OFFICE
CERTIFICATE OF CORRECTION

PATENT NO. : 3,851,017
DATED : November 26, 1974
INVENTOR(S) : Gerhardt P. Werber It is certified that error appears in the above-identified patent and that said Letters Patent are hereby corrected as shown below:

In column 1, line 35 - delete the word "atmospherc" and substitute the word -- atmospheric --.

In column 2, line 8 - delete the word "inintentionally" and substitute the word -- unintentionally --.

In column 2, insert the heading -- THE INVENTION -- between lines 54 and 55.

In column 5, line 59 - delete the word "flowably" and substitute the word -- flowable --.

In column 6, line 74 - delete the word "di(penamethyleneglycol)" and substitute the word -- di(pentamethyleneglycol --.

In column 7, line 67 - after the word "to" and before the number "12" insert the word -- about --.

In column 11, line 1 - delete the "the" and substitute the word -- The --.

In column 12, line 44 - delete the word "powered" and substitute the word -- powdered --.

In column 12, line 64 - delete the word "powered" and substitute the word -- powdered --.

Signed and Sealed this

Ninth Day of November 1976

[SEAL]

Attest:

RUTH C. MASON
Attesting Officer

C. MARSHALL DANN
Commissioner of Patents and Trademarks